March 8, 1932. A. E. CHURCH 1,848,317
CHUCK OPERATING MEANS
Filed Nov. 12, 1930 3 Sheets-Sheet 1

Witness
H. Woodall

Inventor
A. E. Church
By H. A. Williston &co.
Attorneys.

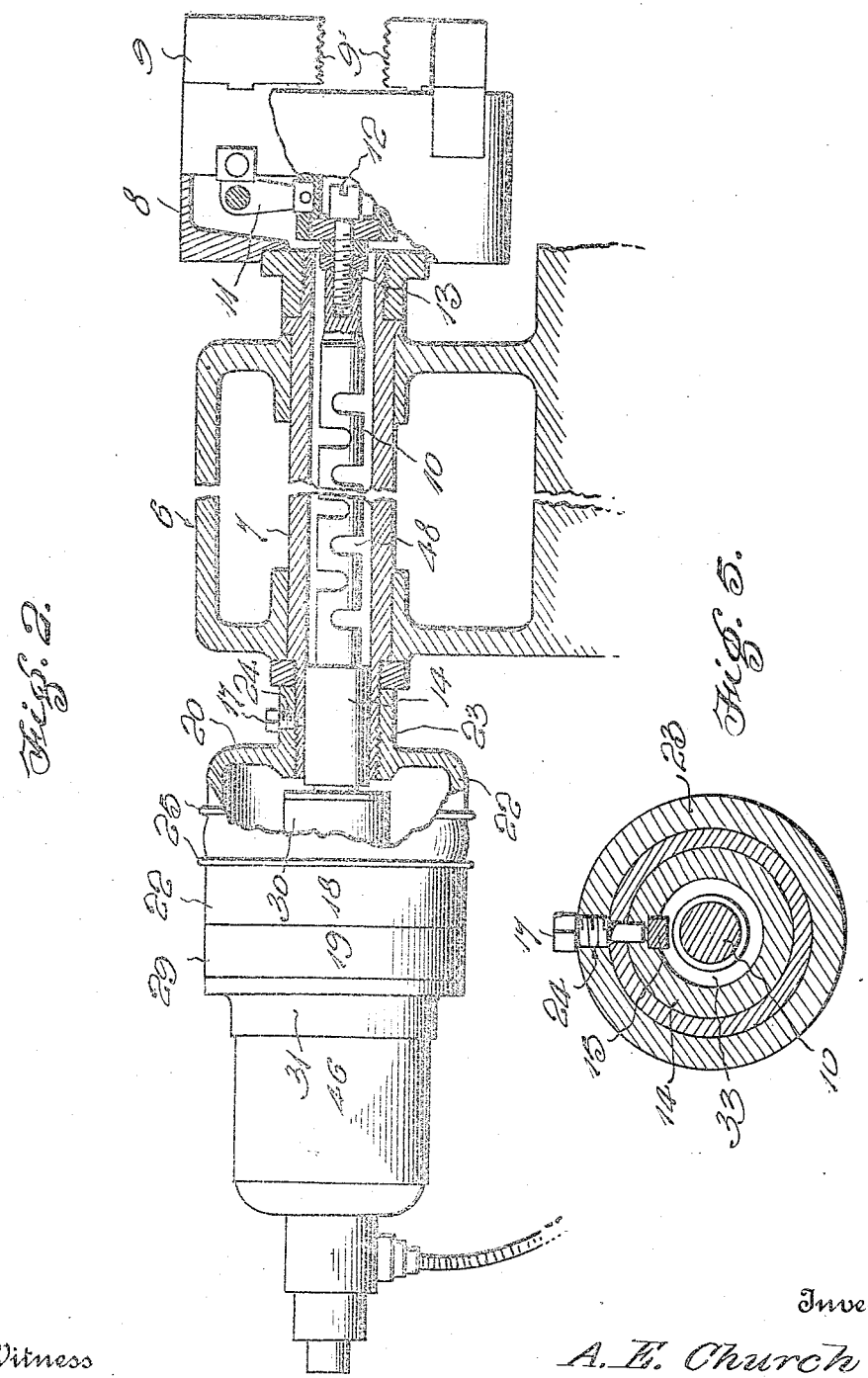

Patented Mar. 8, 1932

1,848,317

UNITED STATES PATENT OFFICE

ALBERT E. CHURCH, OF NEW BRITAIN, CONNECTICUT, ASSIGNOR TO THE UNION MANUFACTURING COMPANY, OF NEW BRITAIN, CONNECTICUT, A CORPORATION OF CONNECTICUT

CHUCK OPERATING MEANS

Application filed November 12, 1930. Serial No. 495,261.

The invention relates to operating mechanisms for chucks such as those commonly used upon metal lathes, broaching machines and the like. On such machines, the chuck is carried by a tubular spindle mounted in the head stock of the machine, a longitudinally shiftable rod is disposed within the spindle and connected with the chuck for opening or closing the chuck jaws when the rod is longitudinally shifted in the proper direction, and means are provided at the end of the spindle remote from the chuck for effecting the longitudinal shifting of said rod.

It is one object of my invention to provide a generally improved and simplified, yet an unusually efficient structure for longitudinally shifting the above-named rod to effect jaw-opening and closing.

It is another object of the invention to provide a chuck-operating rod of longitudinally resilient form, whereby after shifting said rod to engage the chuck jaws with the work, the rod-shifting means will longitudinally stress the resilient rod, with the result that if the jaw teeth further penetrate the work during operation of the machine, the resiliency of the rod will come into play to effect further jaw-movement, thus insuring that the work shall still be tightly held.

With the foregoing in view, the invention resides in the novel subject matter hereinafter described and claimed, description being accomplished by reference to the accompanying drawings.

Fig. 2 is a longitudinal sectional view partly in elevation, showing the tubular spindle, the jaw-operating rod passing therethrough, the chuck on one end of the spindle, and the mechanism on the other end of said spindle for effecting rod shifting.

Fig. 3 is an enlarged longitudinal sectional view through the rod-shifting mechanism.

Fig. 5 is a similar view on line 5—5 of Fig. 3.

Figure 1:
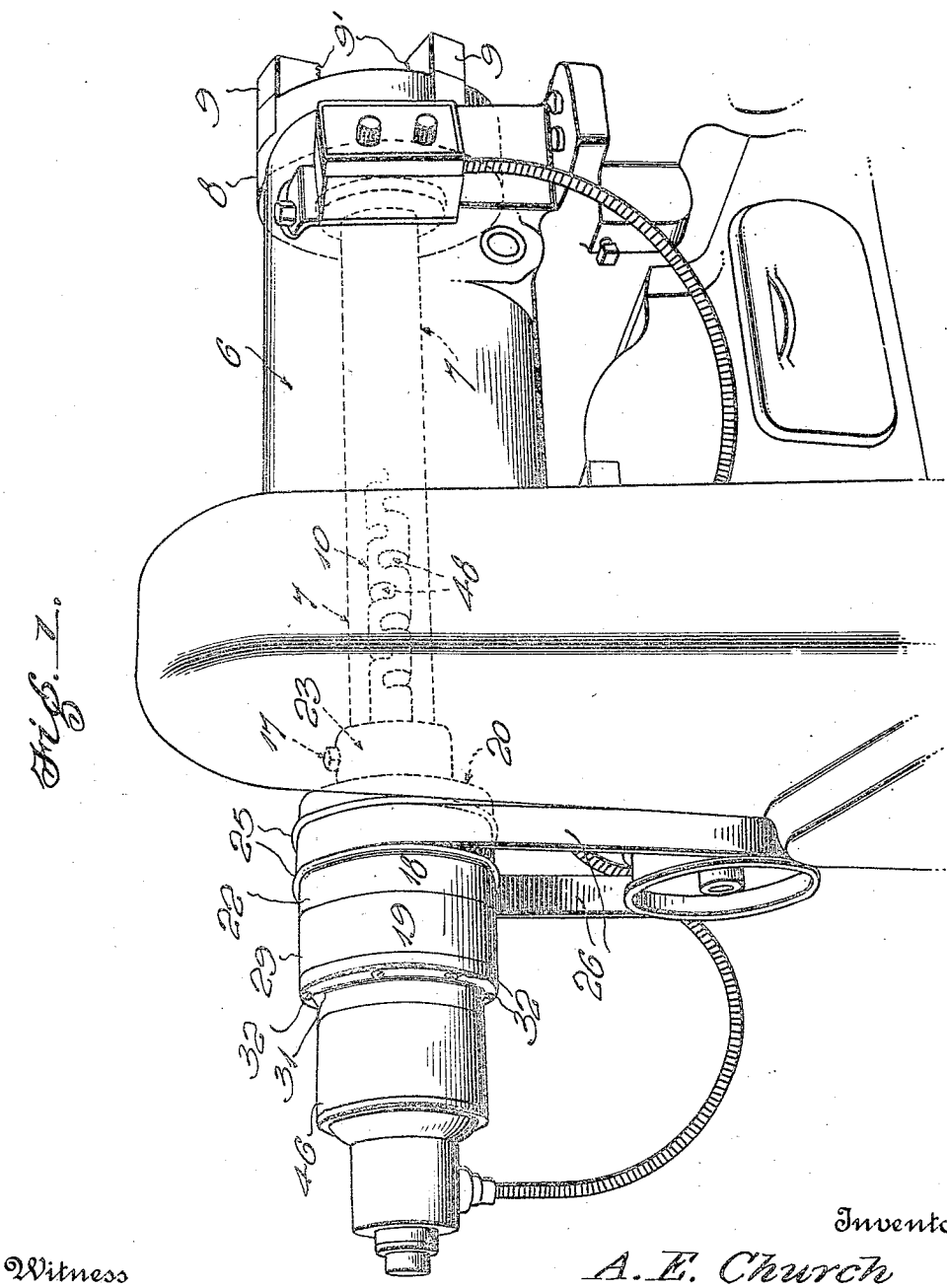
Fig. 1 is a perspective view of a portion of the flat turret lathe embodying the invention.

A flat turret lathe 6 is shown embodying the usual tubular spindle 7, one end of which is provided with a chuck 8 having conventional jaws 9. A rod 10 is disposed within the spindle 7 and is operatively connected with the jaws 9 for moving them inwardly when the rod is moved in one direction, and outwardly when said rod is moved in the other direction. In the present showing, the chuck 8 embodies levers 11 for moving the jaws 9, the inner ends of said levers 11 being connected with a head 12 which is secured by any appropriate means 13, to the rod 10. If the connection between rod and jaw-operating means be such as to hold the rod 10 against turning with respect to the spindle 7, no other means will be necessary for this purpose. However, in the present disclosure, the connection 13 is threaded and hence it is advisable to provide means for holding the rod 10 against rotation with respect to the spindle 7. For this purpose, a sleeve 14 has been shown, secured within the end of the spindle 7 remote from the chuck 8, said sleeve having a key 15 slidably received in a keyway 16 in the rod 10. A screw 17 is shown for securing the sleeve 14 in the spindle 7, and this screw performs a further function hereinafter described.

A drum is mounted upon the end of the spindle 7 remote from the chuck 8, said drum containing means for shifting the rod 10 in either direction. This drum, in the present showing, embodies two sections 18 and 19. The drum section 18 is provided with a closed end 20, with an open end 21 and with a continuous peripheral wall 22. The end 20 is provided with a hub 23 which is threaded upon the spindle 7, said hub having an opening 24 through which the screw 17 passes, so that this screw locks the hub upon the spindle. The wall 22 is provided with spaced ribs 25 and the area between these ribs constitutes a pulley for engagement with a conventional spindle-driving belt 26.

The drum section 19 embodies a closed end 27, an open end 28 and a continuous peripheral wall 29. The closed end 27 of the drum section 19 is provided with a rigid bearing 30 which projects centrally into the drum section 18, and the open end 28 of said drum section 19, is closed by an annular end wall 31. Suitable means such as screws 32, are employed for securing the two drum sections 18 and 19 and the end wall 31 in the assembled relation shown most clearly in Fig. 3.

A tubular nut 33 is rotatably mounted in the bearing 30, main bearings 34 and 35 and end thrust bearings 36, all of anti-friction nature, being provided for said nut. The interior of this nut has a threaded engagement with the threaded end 37 of the rod 10, so that when said nut 33 is rotated in one direction with respect to the drum, rod 10 will be shifted in one direction, whereas reverse movement of said rod is effected by reverse rotation of said nut.

Figure 4:
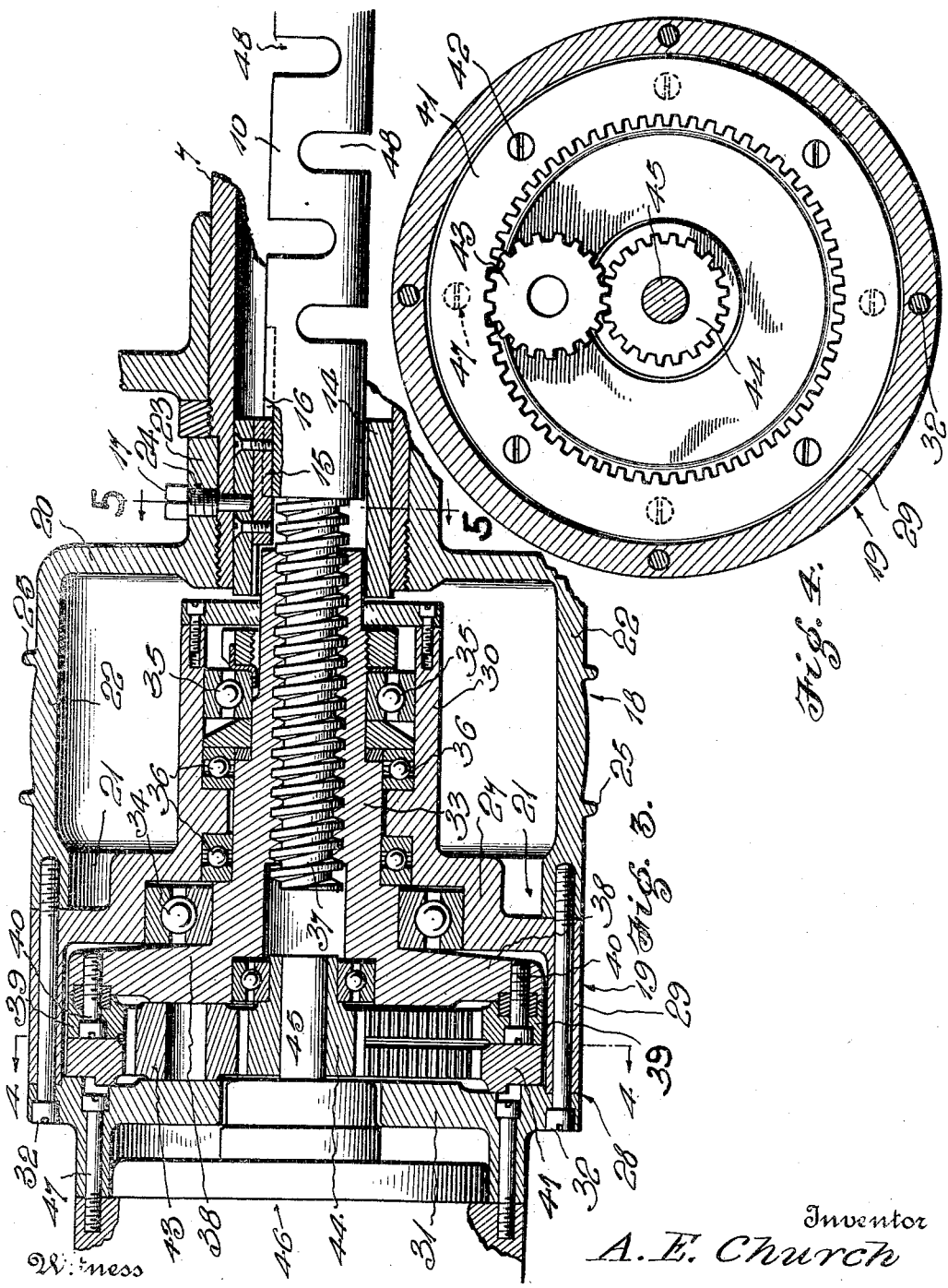
Fig. 4 is a vertical transverse sectional view on line 4—4 of Fig. 3.

The end of the nut 33 most remote from the rod 10, is provided with a rigidly attached disk 38 disposed within the drum section 19. An internal gear ring 39 is secured to the disk 38 by appropriate means 40, and a second internal gear ring 41 is secured against the inner side of the end wall 31, by appropriate means 42 (Fig. 4). The rings 39 and 41 are opposed, said rings are of uniform internal diameter, and there is a slight difference in the number of teeth of said rings, one ring preferably having one more tooth than the other. A planet gear 43 whose ends abut the disks 38 and 31, is in mesh with both of the gear rings 39 and 41, and a sun gear 44 is in mesh with said planet gear 43. Gear 44 is secured upon the shaft 45 of an electric motor 46 or other appropriate contrivance whereby said gear 44 may be driven. The casing of the motor or the like 46 is secured to the annular end wall 31, by any appropriate means such as the screws 47.

When the motor or the like 46 drives the sun gear 44 in one direction, the planet gear 43 is driven and rolls around the inner periphery of the ring gear 41, the difference in the teeth of the two gears 41 and 39, causing the latter to be slowly driven, with the result that the disk 38 and nut 33 are also driven, thus causing said nut to effect movement of the rod 10 in one direction or the other. Reversal of the motor or the like 46 causes the nut-driving mechanism to rotate the nut 33 in the reverse direction, thereby moving the rod 10 in the opposite direction from the first described movement.

The rod 10 is rendered longitudinally resilient, by providing it with transverse, peripheral notches 48 which are disposed in staggered relation, all of said notches extending inwardly past the longitudinal center line of the rod. Hence, the notched portion of the rod may either stretch or compress longitudinally to a limited extent, it being of course understood that steel of proper quality is used in the construction of this rod. When the rod is moved by the nut 33 to contract the chuck jaws 9 against the work, movement of said jaws is restricted by engagement of their conventional teeth 9' with the work. In the present showing, this jaw contraction takes place when rod 10 is pulled away from the chuck 8, and as soon as the jaws come to rest against the work, the nut 33 longitudinally stretches said rod 10 to some extent before said nut is brought to a standstill. This longitudinal stretching or tensioning of the rod 10 is of great importance, for the rod will exert a continual pull upon the levers 11, serving to further contract the jaws 9, should their teeth 9' bite further into the work during operation of the machine. Thus, instead of allowing the work to loosen in the chuck as now often occurs, it is insured that the jaws shall remain in tight gripping engagement with the work.

Excellent results have been obtained from the general construction shown and described and such construction is therefore preferably followed. However, within the scope of the invention as claimed, numerous variations may be made, and while the invention is shown in connection with a chuck, it may be used also with other adequate work holders. Furthermore, the rod 10 may be tubular if desired and may be rendered longitudinally resilient by means other than the notches 48.

I claim:—

1. In a chuck operating means, a bearing adapted to be axially alined with and carried by the end of a chuck-carrying spindle remote from the chuck, a tubular nut rotatably mounted in said bearing, a chuck-operating rod threaded in and extending from one end of said nut for connection with the chuck, an internal gear ring disposed at the other end of the nut and rotatable bodily therewith, a second internal gear ring opposed to the first named ring and rotatable bodily with said bearing, the two gear rings being of the same internal diameter but having slightly different numbers of teeth, a planet gear meshing with both of said gear rings, a sun gear meshing with said planet gear, and means for rotating said sun gear.

2. In a chuck operating means, a drum adapted to be axially alined with and carried by the end of a chuck-carrying spindle remote from the chuck, said drum having an internal bearing co-axial therewith, a tubular nut rotatably mounted in said bearing, a chuck-operating rod threaded into said nut and extending from one end thereof for connection with the chuck, an internal gear ring disposed at the other end of said nut and rotatable bodily therewith, a second internal gear ring opposed to the first named ring and secured in said drum to rotate with the latter, said gear rings being of the same internal diameter but having slightly different numbers of teeth, a planet gear meshing with both of said ring gears, a sun gear meshing with said planet gear, and driving means for said sun gear mounted on one end of said drum.

3. In a chuck operating means, a drum section having a closed end, an open end and a continuous side wall, said closed end being provided with a hub for connection with the end of a chuck-carrying spindle remote from the chuck, a second drum section having an open end, a closed end and a continuous side wall, said closed end of the second drum section closing said open end of the first named drum section and having a central bearing extending into the latter, an annular end wall for said second drum section, means securing said end wall and said drum sections in assembled relation, a tubular nut rotatably mounted in said bearing and having a rigidly attached disk in said second drum section, two opposed internal gear rings in said second drum section secured to said disk and said end wall respectively, said gear rings being of uniform internal diameter but having slightly different numbers of teeth, a planet gear in said second drum section meshing with both of said ring gears, a sun gear in said second drum section meshing with said planet gear, and driving means for said sun gear having a casing secured to said end wall.

4. A structure as specified in claim 1; together with a sleeve around said rod and means for securing said sleeve in the spindle, said sleeve and rod having slidably engaged means for holding the rod against turning with respect to the sleeve.

5. In a chuck having work-gripping jaws, an elongated stiff spring adapted when stressed in one direction to exert a force to hold said jaws tightly engaged with the work, means operatively connecting one end of said spring with said jaws, and means connected with the other end of said spring for positively moving said other end longitudinally in one direction to stress said spring and effect jaw application, and for positively moving said other spring end in the other direction to effect jaw release.

6. In a chuck, a tubular spindle, a chuck head on one end of said spindle, spring-stressing means at the other end of said spindle, manually-controlled power-actuated means mounted on said other end of the spindle for actuating said spring-stressing means, work-gripping jaws mounted on said chuck head, an elongated stiff spring disposed longitudinally in said tubular spindle and operatively connected at one end with said spring-stressing means, and means operatively connecting the other end of said spring with said jaws for applying the latter when the spring is stressed and for releasing said jaws when the spring is relieved of stress.

7. In a chuck, a tubular spindle, a chuck head on one end of said spindle, a rotatable member co-axial with and disposed at the other end of said spindle, means mounting said rotatable member and holding it against movement longitudinally of said spindle, work-gripping jaws mounted on said head, a second relatively non-rotatable member having a threaded engagement with said rotatable member, an elongated stiff spring disposed longitudinally in said tubular spindle and operatively connected at one end with said second member to be longitudinally stressed by the latter, means operatively connecting the other end of said spring with said jaws to hold the latter in work-gripping position when the spring is stressed, and means for rotating said rotatable member to effect spring-stressing movement of said second member.

8. A structure as specified in claim 7; said rotatable member being in the form of a nut; said second member being in the form of a screw threaded into said nut; said screw being connected to said spring.

9. An elongated chuck-operating spring having a co-axial attached screw at one end, jaw-operating means connected with the other end of said spring, and rotatable means threaded on said screw for longitudinally shifting said screw to stress and release the spring.

10. An elongated chuck-operating rod having a co-axial integral screw on one end, the part of said rod independent of said screw having longitudinally spaced transverse notches rendering it longitudinally resilient.

In testimony whereof I affix my signature.

ALBERT E. CHURCH.